US009209900B2

(12) United States Patent
Cai

(10) Patent No.: US 9,209,900 B2
(45) Date of Patent: Dec. 8, 2015

(54) METHOD AND APPARATUS FOR DIGITAL POLARIZATION SCRAMBLING IN COHERENT OPTICAL COMMUNICATION SYSTEMS EMPLOYING BOTH TRANSMIT AND RECEIVE DIGITAL SIGNAL PROCESSING

(71) Applicant: ZTE (USA) Inc., Iselin, NJ (US)

(72) Inventor: Yi Cai, Jackson, NJ (US)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/305,190

(22) Filed: Jun. 16, 2014

(65) Prior Publication Data

US 2014/0369684 A1 Dec. 18, 2014

Related U.S. Application Data

(60) Provisional application No. 61/835,925, filed on Jun. 17, 2013.

(51) Int. Cl.
| | | |
|---|---|---|
| H04B 10/00 | (2013.01) | |
| H04B 10/2507 | (2013.01) | |
| H04B 10/2569 | (2013.01) | |
| H04J 14/06 | (2006.01) | |
| H04J 14/02 | (2006.01) | |
| H04B 10/61 | (2013.01) | |

(52) U.S. Cl.
CPC ........ *H04B 10/2572* (2013.01); *H04B 10/2569* (2013.01); *H04B 10/6162* (2013.01); *H04J 14/02* (2013.01); *H04J 14/06* (2013.01)

(58) Field of Classification Search
CPC ............. H04B 10/2569; H04B 10/505; H04B 10/5055; H04B 10/532; H04B 10/588; H04B 10/541
USPC ........... 398/65, 152, 184, 158, 159, 192, 193, 398/194, 202, 205, 208, 79, 183, 209, 147, 398/81, 135, 136, 33, 154
See application file for complete search history.

(56) References Cited

U.S. PATENT DOCUMENTS

| 8,351,795 B2* | 1/2013 | Nakashima et al. .......... 398/158 |
| 2009/0162059 A1 | 6/2009 | Nakamoto |
| 2010/0111531 A1* | 5/2010 | Tanimura et al. ............... 398/65 |
| 2011/0150498 A1* | 6/2011 | Meiman et al. ............... 398/152 |

FOREIGN PATENT DOCUMENTS

| EP | 1679810 A1 | 7/2006 |
| EP | 2355389 A2 | 8/2011 |
| EP | 2464038 A1 | 12/2011 |
| EP | 2501067 A1 | 9/2012 |

OTHER PUBLICATIONS

Extended European Search Report dated Oct. 6, 2014, from related European Patent Application No. 14172540.8, 7 pages.

* cited by examiner

*Primary Examiner* — Hanh Phan
(74) *Attorney, Agent, or Firm* — Duane Morris LLP

(57) ABSTRACT

An improved method and apparatus for reducing performance degradation in optical fiber transmission system due to polarization mode dispersion and nonlinear polarization coupling. Digital polarization scrambling with transmit and receive digital signal processing is used to reduce these effects. By performing digital polarization scrambling on all possible states of polarization with respect to the two principle axes of an optical fiber, the SOP dependent penalty is averaged out. The invention also provides a method and apparatus for performing digital polarization scrambling on the transmit side and blinded polarization tracking or synchronized polarization descrambling at the receive side. Using a configurable scrambling speed, the invention works as a polarization scanner low speed SOP rotation or as a scrambler at fast SOP rotation speeds. Synchronization of the transmit scramble and the receive descrambler is achieved with scrambling and descrambling control modules based on a common pseudo random bit sequence.

16 Claims, 4 Drawing Sheets

METHOD AND APPARATUS FOR DIGITAL POLARIZATION SCRAMBLING IN COHERENT OPTICAL COMMUNICATION SYSTEMS EMPLOYING BOTH TRANSMIT AND RECEIVE DIGITAL SIGNAL PROCESSING

RELATED PATENT APPLICATIONS

This application claims benefit of priority under 35 U.S.C. §119(e) to Provisional Application No. 61/835,925, entitled "Method and Apparatus for Digital Polarization Scrambling in Coherent Optical Communication Systems Employing both Tx and Rx Digital Signal Processing," filed Jun. 17, 2013, which is incorporated by reference herein in its entirety.

FIELD OF THE INVENTION

The present invention relates generally to optical fiber communication systems and methods.

BACKGROUND OF THE INVENTION

Optical communication systems based on coherent detection and digital signal processing (DSP) are known in the art. Coherent detection refers to a mode of fiber optic communication where the receiver exploits knowledge of the carrier's phase to detect and recover the underlying signal. Digital signal processors permit relatively low cost, highly customizable, and high speed mathematical manipulation of digital information signals. Coherent detection and digital signal processing have proven indispensable in ultra-high speed optical transport to improve receiver sensitivity and achieve superior channel equalization of signal impairments.

In optical fiber transmissions, polarization effects such as polarization mode dispersion (PMD) and nonlinear polarization coupling are known to degrade transmission performance. PMD is a form of dispersion where two different polarizations of light in a waveguide travel at different speeds due to random imperfections and asymmetries in the path, resulting in random spreading of optical pulses. Due to the physical nature of the polarization related effects, the magnitude of this performance degradation is dependent on the state of polarization (SOP). For example, the most significant signal distortion induced by PMD happens when the SOP of a transmitted signal has a 45 degree angle with respect to the two principle axes of an optical fiber channel. By contrast, a signal with an SOP that is aligned with one of the two principle axes can propagate through the optical fiber channel with no PMD induced distortion. Signals with SOPs that vary between these extremes suffer varying degrees of PMD induced distortion.

These polarization dependent impairments can be mitigated to some extent using techniques for polarization scanning and scrambling. A polarization scanner converts any input state of polarization to any desired state of output polarization. A polarization scrambler rapidly varies the polarization of light within a system using a polarization controller so that the polarization related effects are averaged over different SOPs.

In contemporary optical fiber communication systems, polarization scanning and scrambling may be implemented with electro-optic devices such as lithium niobate (LiNbO3) devices placed in the path of an optical signal. Polarization scramblers vary the normalized Stokes vector of the polarization state over the entire Poincaré sphere. The Stokes parameters are a set of values that describe the polarization state of electromagnetic radiation. The Poincaré sphere provides a model for visualizing the last three Stokes parameters in spherical coordinates. Lithium niobate devices are effective at mitigating polarization dependent effects but they are relatively expensive and require physical modification of the light path in an optical fiber transmission system and lack the flexibility of digital processors.

SUMMARY OF THE INVENTION

The present invention provides systems and methods for addressing the short comings of the prior art by providing transmitter (Tx) and receiver (Rx) end digital signal processing to permit polarization scrambling in the digital domain before modulation of the signal in an optical signal and subsequent descrambling by a digital signal processor at the receiver end.

In accordance with various embodiments of the present invention, however, for the new generations of coherent optical fiber communication systems having a high speed digital to analog converters (DACs), a digital polarization scrambler is implemented to provide a more flexible, smaller size, and lower cost candidate to perform polarization scanning and scrambling. Moreover, in a further embodiment, an Rx side polarization descrambler can be implemented to work together with the Tx polarization scrambler in a synchronized manner, which is not possible for the conventional analog electro-optical polarization scrambler implemented in lithium niobate.

DSP techniques were first applied to receiver (Rx) side optical transmission systems after analog to digital converters (ADCs) with a sampling rate higher than 50 Giga samples/s became commercially available. Following high-speed ADCs, it was recently announced that high-speed digital-to-analog converters (DACs) will also soon be commercially available. Consequently, with the development of that technology, it becomes possible to incorporate Tx side DSPs to further enhance optical transmission system performance by performing operations on signals while still in the digital domain.

Further features and advantages of the present invention, as well as the structure and operation of various embodiments of the present invention are described in detail below with reference to the accompanying drawings.

BRIEF DESCRIPTION OF THE DRAWINGS

The present invention, in accordance with one or more various embodiments, is described in detail with reference to the following Figures. These drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily made to scale.

DETAILED DESCRIPTION OF EXEMPLARY EMBODIMENTS

The approach of the present invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

In the following description of exemplary embodiments, reference is made to the accompanying drawings which form a part hereof, and in which it is shown by way of illustration of specific embodiments in which the invention may be practiced. It is to be understood that other embodiments may be utilized and structural changes may be made without departing from the spirit or scope of the invention.

Generally, the invention is directed toward systems and methods for communicating information using a fiber optic communication medium. More specifically, the invention is directed to systems and methods for transmitting, receiving and detecting optical signals in a coherent fiber optic communication system. Even more specifically, the invention is directed to systems and methods for performing both transmit and receive side digital signal processing to perform polarization scrambling and descrambling respectively on signals transmitted over a coherent fiber optic communication system. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
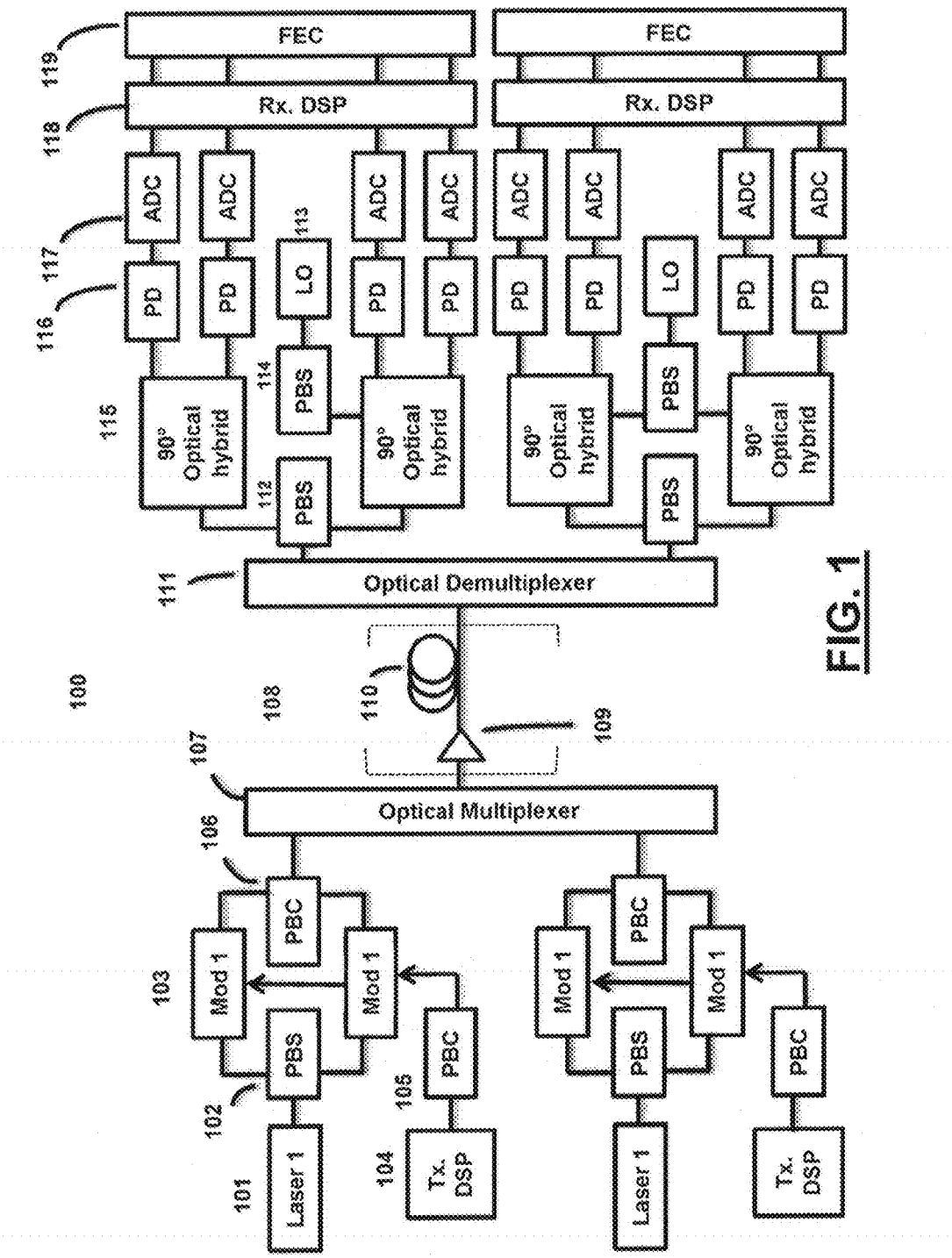
FIG. 1 depicts an exemplary wavelength division multiplexing fiber optic transmission system according to an embodiment of the invention.

Referring now to FIG. 1, this figure depicts an exemplary wavelength division multiplexing (WDM) fiber optic transmission system 100 according to various embodiments of the invention. The system in FIG. 1 is a coherent detection WDM optical transmission system with Tx and Rx digital signal processors (DSPs). The light-wave generated with a laser 101 is split by a polarization beam splitter (PBS) 102 and individually modulated by an I/Q optical modulator 103, and then combined with a polarization beam combiner (PBC) 106 to create a polarization multiplexed quadrature amplitude modulated (QAM) signal. This QAM modulation can be realized by cascaded serial or parallel modulators or other suitable modulator. The driving signals for the I/Q optical modulators 103 are generated from the data sequence to be transmitted through Tx DSP 104 and digital-to-analog converter 105. The modulated optical signals corresponding to the different I and Q channels are then combined with PBC 106. The output of the PBC 106 is combined in optical multiplexer 107 with the output from laser 2 circuit shown below in FIG. 1 before being passed on to the optical transmission link 108. The transmission link 108 consists of optical amplifier (OA) 109 and length of optical fiber 110.

At the other end of the transmission link, an optical demultiplexer 111 is used to demultiplex the respective WDM channels to enable coherent detection. Polarization beam splitter 112 separates the components of each channel. A laser oscillator (LO) 113 supplies an oscillation signal to another polarization beam splitter 114. PBS 114 in turn supplies the output of the LO to respective 90° optical hybrid devices 115 to mix with the received polarization split received signal from PBS 112. The polarization and phase diversified signals then are sent to respective photodiodes (PD) 116 and digitally sampled with analog-to-digital converters 117. A Rx side digital signal processing unit 118 receives the outputs of ADCs 117 to perform various processing functions including compensating for the optical front end distortion caused by the 90° optical hybrid devices 115 and photodiodes 116, and to equalize the static and dynamic linear impairments, timing and carrier recovery. Forward error correction may also be performed in module 119. Alternatively, this function may be performed in the Rx DSP 118.

As discussed above, a conventional implementation of polarization scrambling uses an electro-optic polarization scrambler such as an LiNbO3 device following the PBC at the transmitter side. The electro-optic polarization scrambler can be a combination of several half and quarter wave plates, the rotation of which is driven by a set of electrical control signals. In various embodiments of the invention, the need for such equipment is obviated. Instead, polarization scrambling is performed by the Tx DSP 118 in FIG. 1. A more detailed discussion of the internal structure of the Tx DSP 104 is depicted in FIG. 2.

Figure 2:
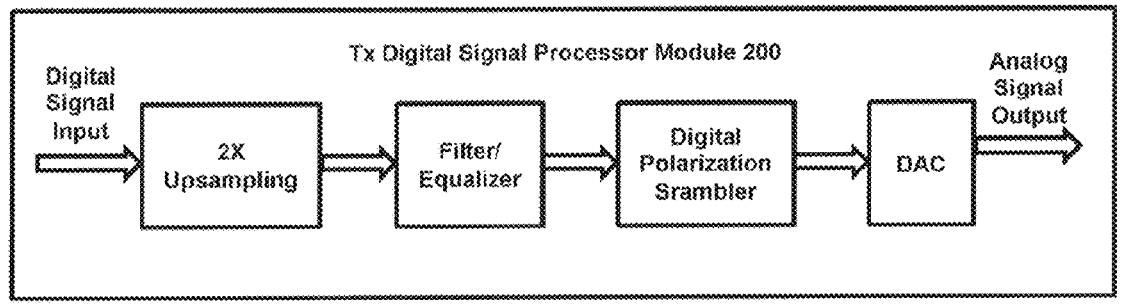
FIG. 2 depicts an exemplary transmit digital signal processing module according to an embodiment of the invention.

FIG. 2 depicts internal functional blocks of an exemplary transmit digital signal processing module according to an embodiment of the invention, such as the Tx DSP 104 shown in FIG. 1. The elements shown in the module 200 of FIG. 2 are merely representative blocks illustrating functions performed by the Tx DSP module 104. These functional blocks may be implemented in by an algorithm, software running on hardware, firmware, application specific integrated circuit (ASIC) or other suitable digital structure. One or more digital signal processors may be used in the TX DSP module 200 of FIG. 2, either serially or in parallel, without departing from the spirit or scope of the invention.

The input to the Tx DSP module 200 is information bits to be transmitted over the fiber transmission system. In one embodiment, binary input bits entering the module 200 are first up-sampled to 2 times the baud rate. The up-sampled bits are then fed into a pre-equalizer for spectrum shaping, linear and nonlinear effects pre-compensation, etc. Following the pre-equalization, the signals in the two polarizations are fed into a digital polarization scrambler. The scrambler can be modeled as a matrix multiplier given by equation (1) below:

$$\begin{bmatrix} Sxo \\ Syo \end{bmatrix} = \begin{bmatrix} Mxx & Myx \\ Mxy & Myy \end{bmatrix} \begin{bmatrix} Sxi \\ Syi \end{bmatrix}. \quad (1)$$

where Sxi, Syi represent the two polarization components of the input signal to the digital scrambler, Mxx, Myx, Mxy, Myy are the four components of a polarization rotation matrix M, and Sxo, Syo represent the two polarization components of the output signal after the polarization scrambling.

The implementation of the matrix multiplication is equivalent to a 2-in 2-out single tap butterfly-structured finite impulse response (FIR) filter. The matrix M can have different representations, such as a Stokes matrix based representation using two angle values, i.e. azimuth and ellipticity angles, to control the SOP rotation in latitude and longitude on a Poincaré sphere. Alternatively, the matrix M can be formed in a Jones matrix format that takes the amplitude ratio and phase difference of the two polarization components as the controlling factors for SOP rotation scrambling. Eq. (2) gives an example of an matrix M with two SOP controlling angles θ and β.

$$\begin{bmatrix} Mxx & Myx \\ Mxy & Myy \end{bmatrix} = \begin{bmatrix} \cos\theta\cos\beta - j\sin\theta\sin\beta & -\sin\theta\cos\beta + j\cos\theta\sin\beta \\ \sin\theta\cos\beta + j\cos\theta\sin\beta & \cos\theta\sin\beta + j\sin\theta\sin\beta \end{bmatrix}. \quad (2)$$

After the SOP scanning/scrambling, the digital signal is converted to an analog signal through a digital-to-analog converter (DAC) resulting in an analog output signal used to drive the modulators 103 as shown in FIG. 1. Although shown inside the Tx DSP module in FIG. 2, it should be appreciated by those of ordinary skill in the art that in various embodiments, the DAC may be located outside of the Tx DSP module 200.

Figure 3:
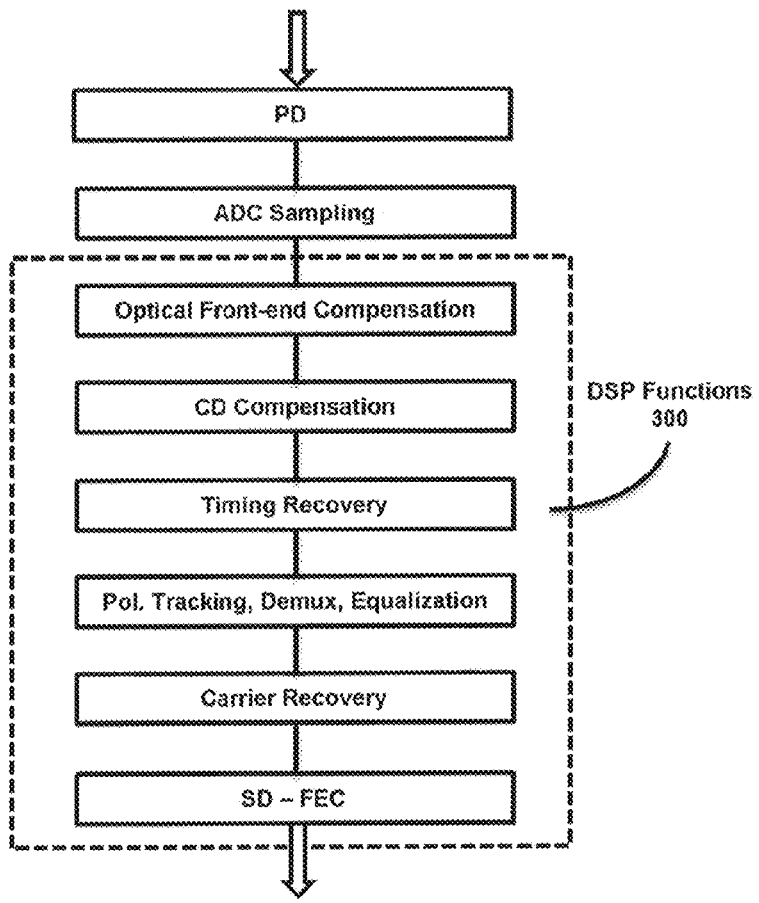
FIG. 3 depicts an exemplary receive digital signal processing module according the prior art.

Turning now to the receive (Rx) side of the WDM transmission system, FIG. 3 is a flow chart of functional blocks depicting the function performed in an exemplary Rx digital signal processing module according the prior art. The input optical signal is first detected and converted to an electrical signal by a photodetector (PD). The resulting analog electrical signal is sampled and converted to a digital signal with an ADC. Then, DSP functions 300 are performed including but not limited to, optical front-end skew compensation, chromatic dispersion (CD) compensation, timing recovery, polarization tracking/equalization, carrier recovery, and forward error correction (FEC). In these function blocks, the polarization tracking, Demux and equalization is where the descrambling of the polarization scrambled signal occurs. Those of ordinary skill in the art will appreciate that these functions may not be performed in the exact order shown here. Also, more or fewer functions than those depicted in FIG. 3 may be performed, including functions not shown in FIG. 3, without departing from the spirit of scope of the invention.

Figure 6:
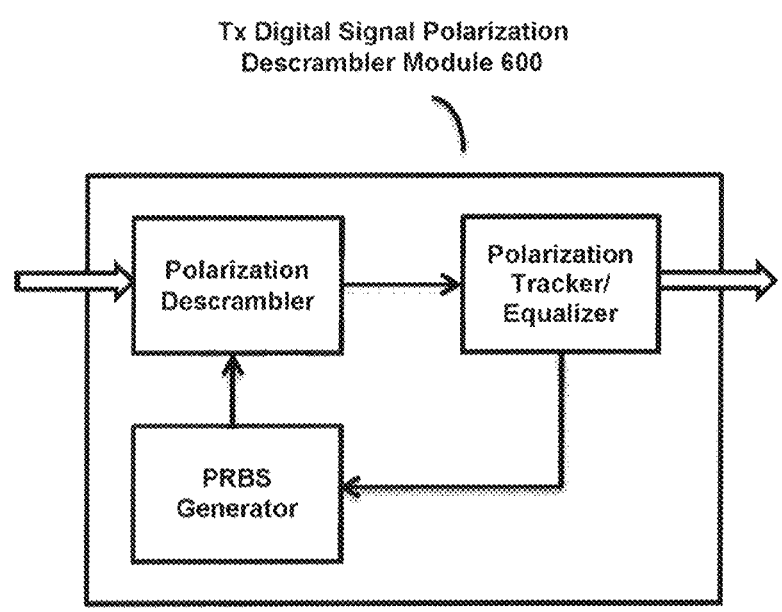
FIG. 6 depicts an exemplary receive digital signal processing module according to another embodiment of the invention.

Two polarization tracking/equalization schemes used in modern optical fiber Rx systems are the blind constant modulus algorithm (CMA) scheme and the decision directed least mean square (DDLMS) algorithm. Neither require preknowledge of the SOP change and both can track slow SOP drifting. However, neither scheme, is effective at tracking a quick SOP state change resulting from high speed polarization scrambling. Therefore, in at least one exemplary embodiment, the invention provides a scheme to resolve or mitigate the high speed polarization scrambling/descrambling problem by introducing an apparatus that can synchronize the Tx scrambling and Rx descrambling so that the Rx system knows what it is looking for. Such system are depicted in FIGS. 4 and 6 discussed in greater detail below.

Figure 4:
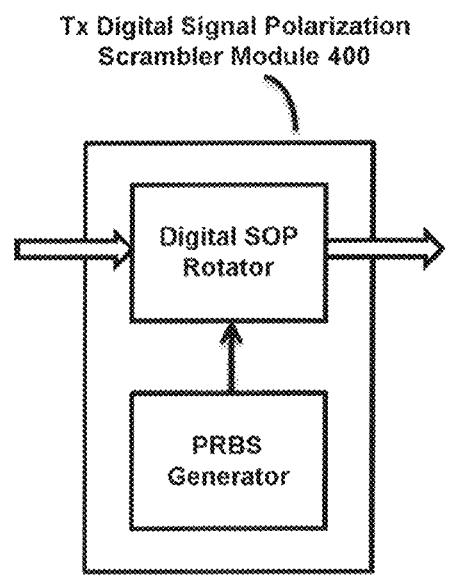
FIG. 4. depicts an exemplary receive digital signal processing module according an embodiment of the invention.

FIG. 4 shows an exemplary embodiment of a digital polarization scrambling module 400 according to various embodiments of the invention. The module 400 of FIG. 4 includes a PRBS generator that generates a pseudorandom binary sequence (PRBS) that is used to control the DSP-based polarization rotation. More specifically, the PRBS sequence can be used as a base for generating the polarization rotation, i.e., the angles of rotation θ and β in Equation 2. By using a PRBS generator, polarization scrambling with high randomness can be achieved due to the pseudo random property of a PRBS. Also, the speed of scrambling can be readily changed by adjusting the speed of PRBS generation as needed. When operated at a relatively low scrambling speed, the digital polarization scrambler module of FIG. 4 serves as a polarization scanner. Alternatively, when operated at a relatively high scrambling speed, it functions as a high speed SOP scrambler.

Figure 5:
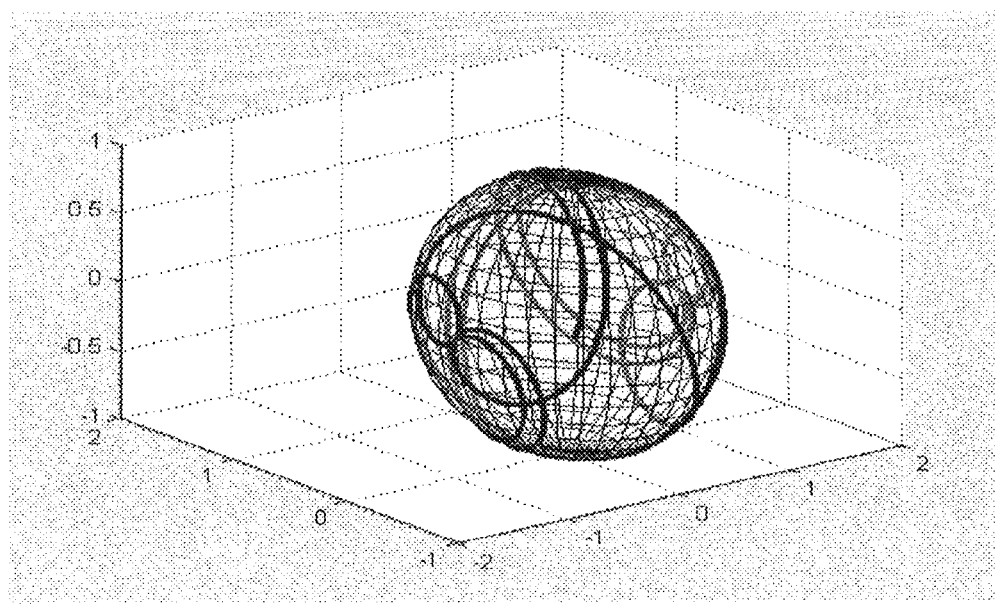
FIG. 5. is a graphic illustrating a scrambling trace on a Poincaré sphere.

By using a DSP the rotation speed can be set dynamically and adjusted based on the requirements of a particular application. FIG. 5 illustrates a resulting SOP trace on a Poincaré sphere from a high speed polarization scanning of a Tx digital polarization scanner, such as that shown in FIG. 4, according to various embodiments of the invention. The Poincaré sphere is a virtual model used to graphically represent states of polarization of light waves. The ribbon-like lines show the scrambled polarization states of the output signal of the Tx digital polarization scrambler.

As mentioned above, commonly used polarization tracking schemes such as constant modulus algorithm and decision directed least mean square are not effective in tracking a signal with quickly a changing SOP, such as that resulting from high speed polarization scrambling. In order to descramble a signal generated by the Tx digital polarization scrambler of FIG. 4, a synchronized high speed descrambling can be implemented in a device such as that illustrated in FIG. 6.

In order to effectively descramble the high speed polarization scrambled signal generated by the scrambler of FIG. 4, the Rx descrambling module 600 of FIG. 6 includes a PRBS generator capable of generating a PRBS that is the same as the one used in the Tx scrambler module that generated the polarization scrambled signal. The generated PRBS is used as the base for generating the polarization rotation angles, i.e., θ and β in Equation 2, in a manner similar to the way the Tx scrambler uses the PRBS to generate the polarization rotation angles. Using mathematical operations performed with a digital signal processing a descrambling matrix H can be computed that is the inversion of the scrambling matrix M can be obtained.

$$H=M^{-1}. \quad (3)$$

Thus, by changing the SOP of the received signal according to the inversion matrix H, polarization descrambling can be achieved as long as the two matrices H and M are synchronized. Synchronization in turn requires the PRBS of the Rx and Tx DSPs to be the same. In one embodiment, PRBS synchronization is achieved without prior knowledge by searching for a correct PRBS seed for a current input signal. Once the correct seed is found, the PRBS generator can work in a synchronized way to generate the correct PRBS sequence that can correctly descramble the received signal. Alternatively, other methods may be used to find the correct PRBS seed for polarization descrambling. For example, the received signal can be buffered to allow the Rx DSP some delay during which a seed search can be performed. As yet another example, a preset data pattern may also be utilized as a reference to search for the correct PRBS seed.

In at least one other embodiment, as also depicted in FIG. 6, a polarization tracker/equalizer may follow the polarization descrambler. In such embodiments, the polarization tracker/descrambler will perform low speed polarization tracking and distortion equalization on signals descrambled by the polarization descrambler. The low-speed polarization tracker/equalizer performs most effectively when the received signal is correctly descrambled by the preceding polarization descrambler. Therefore, the quality of the output signal from the polarization tracker/equalizer can be used as an indicator of whether PRBS synchronization has been obtained. Hence as shown in FIG. 6, a feedback path from the polarization tracker/equalizer to the PRBS generator can be built in the module 600 to complete a PRBS synchronization loop, in accordance with various embodiments of the invention.

Through the various embodiments disclosed herein, effective digital polarization scrambling may be employed in a DSP prior to modulating a signal in laser light providing greater flexibility and reducing and ideally eliminating polarization effects such as PMD and nonlinear polarization coupling thereby enhancing transmission performance of a fiber system while reducing its cost.

Many modifications and other embodiments of the inventions set forth herein will come to mind to one skilled in the art to which these inventions pertain having the benefit of the teachings presented in the foregoing descriptions and the associated drawings. Therefore, it is to be understood that the invention is not to be limited to the specific examples of the embodiments disclosed and that modifications and other embodiments are intended to be included within the scope of the invention. Although specific terms are employed herein, they are used in a generic and descriptive sense only and not for purposes of limitation. Likewise, the various figures or diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

One or more of the functions described in this document may be performed by an appropriately configured module. As used herein, a "module" can refer to hardware firmware, software and any associated hardware that executes software, and any combination of these elements for performing the associated functions described herein. Additionally, as would be apparent to one of ordinary skill in the art, the various modules may be discrete modules; however, two or more modules may be combined to form a single module that performs the associated functions, or the functions of a single module may be divided among two or more modules, according to various embodiments of the invention.

Additionally, one or more of the functions described in this document may be performed by means of computer program code that is stored in a "computer program product," "non-transitory computer-readable medium," and the like, which is used herein to generally refer to media such as, memory storage devices, or storage units. These, and other forms of computer-readable media, may be involved in storing one or more instructions for execution by a processor to cause the processor to perform specified operations. Such instructions, generally referred to as "computer program code" (which may be grouped in the form of computer programs or other groupings), which when executed, enable the computing system to perform the desired operations.

While various embodiments of the invention have been described above, it should be understood that they have been presented by way of example only, and not of limitation. Likewise, the various diagrams may depict an example architectural or other configuration for the invention, which is done to aid in understanding the features and functionality that can be included in the invention. The present invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

What is claimed is:

1. A wavelength division multiplexing optical fiber communication system comprising:
   a signal source at a signal transmission end of the optical fiber communication system;
   a polarization scrambler for scrambling all states of polarization of signals generated at the transmission end before transmission over the optical fiber communication system;
   a length of optical fiber extending from the signal transmission end to a receive end; and
   a polarization descrambler at the receive end for synchronously descrambling all states of polarization of signals received at the receive end;
   a polarization tracker operating on an output of the polarization descrambler and capable of performing distortion equalization on signals descrambled by the polarization descrambler; and
   a feedback loop from the polarization tracker to the polarization descrambler, wherein the feedback loop is a synchronization loop that includes a pseudo-random binary sequence (PRBS) generator.

2. The system of claim 1, wherein the polarization tracker performs one of a blind constant modulus algorithm and a decision directed least mean square algorithm.

3. The system of claim 1, wherein the signal source is one or more lasers suitable for use with an optical fiber communication system.

4. The system of claim 1, wherein the polarization scrambler is implemented in a digital signal processor prior to digital to analog conversion.

5. The system of claim 1, wherein the polarization descrambler is implemented in a digital signal processor after analog to digital conversion of a received optical signal.

6. The system of claim 1, wherein the polarization scrambler is synchronized using a pseudo random bit sequence.

7. A method for communicating signals in an optical fiber communication system comprising:
   generating a signal at a transmission end of the system;
   performing polarization scrambling on all states of polarization of the signal;
   transmitting the signal from the transmission end to a receive end; and
   performing a synchronized descrambling on all states of polarization of the received signal using a polarization descrambler, by first transmitting the signal to the polarization descrambler, then using a polarization tracking operation on an output of the polarization descrambler, and utilizing a feedback loop from the polarization tracking operation to the polarization descrambler, wherein the feedback loop is a synchronization loop that includes a pseudo-random binary sequence (PRBS) generator, wherein the polarization tracking operation includes distortion equalization on the signals descrambled by the polarization descrambler.

8. The method of claim 7, wherein the polarization tracking operation comprises an operation selected from a group consisting of a blind constant modulus algorithm and a decision directed least mean square algorithm.

9. The method of claim 7, wherein generating a signal comprises generating a wavelength division multiplexed laser light signal representative of data to be transmitted with one or more lasers suitable for use with an optical fiber communication system.

10. The method of claim 7, wherein performing polarization scrambling comprises performing operations on a digital signal with a digital signal processor prior to digital to analog conversion of the optical signal.

11. The method of claim 7, wherein performing a synchronized descrambling comprises performing operations on a digital signal with a digital signal processor after analog to digital conversion of a received optical signal.

12. A system comprising:
at least one fiber optic light source for generating signals that communicate information over a fiber optic medium using wavelength division multiplexing;
a fiber optic medium;
at a first end of the fiber optic medium, an adjustable rate polarization scrambler implemented in a digital signal processor;
at a second end the fiber optic medium, a synchronized polarization descrambler for synchronously descramblinq all states of polarization of electrical signals received at the second end;
a polarization tracker operating on an output of the polarization descrambler wherein the polarization tracking operation performs a distortion equalization on the signals descrambled by the polarization descrambler; and
a feedback loop from the polarization tracker to the polarization descrambler, wherein the feedback loop is a synchronization loop that includes a pseudo-random binary sequence (PRBS) generator.

13. The system of claim 12, where the polarization tracker performs a scheme selected from a group consisting of a constant modulus tracking algorithm and a decision directed least mean square algorithm.

14. The system of claim 12, wherein in a first mode characterized by a relatively low speed of state of polarization rotation, the adjustable rate polarization scrambler functions as a polarization scanner, and in a second mode characterized by a relatively higher speed of polarization rotation, the adjustable rate polarization scrambler operates as a scrambler.

15. The system of claim 14, wherein when operating in the second mode, the polarization scrambler and descrambler are synchronized using a common pseudo random bit sequence.

16. The system of claim 12, wherein the at least one fiber optic light source comprises at least one of a light emitting diode and a laser diode.

* * * * *